US007922930B2

(12) United States Patent
Schweitzer et al.

(10) Patent No.: US 7,922,930 B2

(45) Date of Patent: Apr. 12, 2011

(54) AZEOTROPIC COMPOSITIONS COMPRISING FLUORINATED OLEFINS FOR CLEANING APPLICATIONS

(75) Inventors: Melodie A. Schweitzer, Wilmington, DE (US); Allen Capron Sievert, Elkton, MD (US); Joan Ellen Bartelt, Wilmington, DE (US); Barbara Haviland Minor, Elkton, MD (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/782,965

(22) Filed: May 19, 2010

(65) Prior Publication Data

US 2010/0227786 A1 Sep. 9, 2010

Related U.S. Application Data

(62) Division of application No. 12/618,907, filed on Nov. 16, 2009, now Pat. No. 7,744,774, which is a division of application No. 11/897,086, filed on Aug. 29, 2007, now Pat. No. 7,641,808.

(60) Provisional application No. 60/965,920, filed on Aug. 23, 2007.

(51) Int. Cl.

| | |
|---|---|
| ***C09K 5/04*** | (2006.01) |
| ***C11D 7/30*** | (2006.01) |
| ***C11D 7/26*** | (2006.01) |

(52) U.S. Cl. .......... 252/67; 510/177; 510/410; 510/411; 134/40; 134/42

(58) Field of Classification Search .................. 510/177, 510/410, 411; 252/67; 134/40, 42

See application file for complete search history.

(56) References Cited

U.S. PATENT DOCUMENTS

| | | | | |
|---|---|---|---|---|
| 5,162,594 | A | 11/1992 | Krespan | |
| 7,498,296 | B2 | 3/2009 | Schweitzer et al. | |
| 7,641,808 | B2 * | 1/2010 | Schweitzer et al. | 252/67 |
| 7,744,774 | B2 * | 6/2010 | Schweitzer et al. | 252/67 |
| 2007/0098646 | A1 | 5/2007 | Nappa et al. | |
| 2007/0100009 | A1 | 5/2007 | Creazzo et al. | |
| 2007/0100010 | A1 | 5/2007 | Creazzo et al. | |
| 2007/0100011 | A1 | 5/2007 | Creazzo et al. | |
| 2007/0102021 | A1 | 5/2007 | Nappa et al. | |
| 2007/0105738 | A1 | 5/2007 | Nappa et al. | |
| 2007/0108403 | A1 * | 5/2007 | Sievert et al. | 252/67 |
| 2007/0203045 | A1 | 8/2007 | Schweitzer et al. | |
| 2007/0203046 | A1 | 8/2007 | Minor et al. | |
| 2008/0011678 | A1 | 1/2008 | Knapp | |
| 2008/0051612 | A1 | 2/2008 | Knapp et al. | |
| 2008/0060687 | A1 * | 3/2008 | Schweitzer et al. | 134/40 |
| 2008/0295580 | A1 | 12/2008 | Minor et al. | |
| 2008/0314073 | A1 | 12/2008 | Minor et al. | |
| 2009/0012335 | A1 * | 1/2009 | Nappa et al. | 570/153 |
| 2009/0062170 | A1 * | 3/2009 | Schweitzer et al. | 510/178 |
| 2009/0120619 | A1 | 5/2009 | Sievert et al. | |
| 2009/0288431 | A1 | 11/2009 | Rao et al. | |
| 2010/0056412 | A1 * | 3/2010 | Schweitzer et al. | 510/178 |
| 2010/0154419 | A1 * | 6/2010 | Kontomaris | 60/645 |

FOREIGN PATENT DOCUMENTS

| | | | |
|---|---|---|---|
| WO | WO 2007/053178 | A1 | 5/2007 |
| WO | WO 2007/053672 | A2 | 5/2007 |
| WO | WO 2007/100885 | A2 | 9/2007 |

OTHER PUBLICATIONS

Krespan et al., "Fluoroolefin condensation catalyzed by aluminum chlorofluoride", Journal of FluorineChemistry, 77, (1996), pp. 117-126.

Jeanneaux et al., "Addition Thermique Des I0D0-1-Perfluoroalcanes Sur Les Perfluoroalkylethylenes", Journal of Fluorine Chemistry, 4, (1974), pp. 261-270 (Summary in English).

PCT International Search Report and Written Opinion for International Application No. PCT/US2007/018898 dated Jun. 4, 2008.

Reg. No. 1127398-99-5, Mar. 26, 2009.

Reg. No. 1127398-86-0, Mar. 26, 2009.

Reg. No. 35709-14-9, Nov. 16, 1985.

Reg. No. 3910-82-5, Nov. 16, 1984.

Reg. No. 1127399-09-0, Mar. 26, 2009.

Reg. No. 1127399-07-8, Mar. 26, 2009.

Reg. No. 1127399-05-6, Mar. 26, 2009.

Reg. No. 1127399-01-2, Mar. 26, 2009.

Reg. No. 156-60-5, Nov. 16, 1984.

* cited by examiner

*Primary Examiner* — Douglas Mc Ginty

(57) ABSTRACT

The present invention relates to azeotropic or azeotrope-like compositions comprising a fluorinated olefin having the formula E- or Z -$C_3F_7CH{=}CHC_3F_7$, and at least one alcohol, halocarbon, hydrofluorocarbon, fluoroether, or alkanes and combinations thereof. In one embodiment, the one compound selected from the group consisting of alcohols, halocarbons, fluoroalkyl ethers, hydrofluorocarbons, alkanes is either methanol, ethanol, iso-propanol, n-propanol, trans-1,2-dichloroethylene, cis-1,2-dichloroethylene, n-propyl bromide, $C_4F_9OCH_3$, $C_4F_9OC_2H_5$, HFC-43-10mee, HFC-365mfc, heptane, or combinations thereof. In another embodiment, these compositions are useful in cleaning applications as a degreasing agent or defluxing agent for removing oils and/or other residues from a surface.

8 Claims, No Drawings

AZEOTROPIC COMPOSITIONS COMPRISING FLUORINATED OLEFINS FOR CLEANING APPLICATIONS

CROSS REFERENCE(S) TO RELATED APPLICATION(S)

This application is a divisional of U.S. application Ser. No. 12/618,907, filed Nov. 16, 2009, now U.S. Pat. No. 7,744,774, which is a divisional of U.S. application Ser. No. 11/897,086, filed Aug. 29, 2007, now U.S. Pat. No. 7,641,808, which claims benefit of priority of U.S. Provisional Application 60/965,920, filed Aug. 23, 2007.

BACKGROUND OF THE INVENTION

1. Field of the Invention

The present invention relates to compositions comprising fluorinated olefins and at least one alcohol, halocarbon, fluoroalkyl ether, hydrofluorocarbon, or alkane and combinations thereof. These compositions are azeotropic or azeotrope-like and are useful in cleaning applications as a defluxing agent and for removing oils or residues from a surface.

2. Description of Related Art

Flux residues are always present on microelectronics components assembled using rosin flux. As modern electronic circuit boards evolve toward increased circuit and component densities, thorough board cleaning after soldering becomes a critical processing step. After soldering, the flux-residues are often removed with an organic solvent. De-fluxing solvents should be non-flammable, have low toxicity and have high solvency power, so that the flux and flux-residues can be removed without damaging the substrate being cleaned. Further, other types of residue, such as oils and greases, must be effectively removed from these devices for optimal performance in use.

Alternative, non-ozone depleting solvents have become available since the elimination of nearly all previous CFCs and HCFCs as a result of the Montreal Protocol. While boiling point, flammability and solvent power characteristics can often be adjusted by preparing solvent mixtures, these mixtures are often unsatisfactory because they fractionate to an undesirable degree during use. Such solvent mixtures also fractionate during solvent distillation, which makes it virtually impossible to recover a solvent mixture of the original composition.

Azeotropic solvent mixtures may possess the properties needed for these de-fluxing, de-greasing applications and other cleaning agent needs. Azeotropic mixtures exhibit either a maximum or a minimum boiling point and do not fractionate on boiling. The inherent invariance of composition under boiling conditions insures that the ratios of the individual components of the mixture will not change during use and that solvency properties will remain constant as well.

In one embodiment, the present invention provides azeotropic and azeotrope-like compositions useful in semiconductor chip and circuit board cleaning, defluxing, and degreasing processes. The present compositions are non-flammable, and as they do not fractionate, will not produce flammable compositions during use. Additionally, the used azeotropic solvent mixtures may be re-distilled and re-used without composition change.

BRIEF SUMMARY OF THE INVENTION

The present invention relates to azeotropic and azeotrope-like compositions comprising 1,1,1,2,2,3,3,6,6,7,7,8,8,8-tetradecafluorooct-4-ene and, at least one compound selected from the group consisting of alcohols, halocarbons, fluoroalkyl ethers, hydrofluorocarbons, alkanes and combinations thereof. In one embodiment, the at least one compound is selected from the group consisting of:

n-propylbromide;
trans-1,2-dichloroethylene;
cis-1,2-dichloroethylene;
methanol;
ethanol;
n-propanol;
isopropanol;
$C_4F_9OCH_3$;
$C_4F_9OC_2H_5$;
HFC-43-10mee;
HFC-365mfc;
heptane
and combinations thereof.

Additionally, the present invention relates to processes for cleaning surfaces and for removing residue from surfaces, such as integrated circuit devices.

DETAILED DESCRIPTION OF THE INVENTION

Applicants specifically incorporate by reference the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

In one embodiment, the present invention relates to compositions comprising compounds having the formula E- or Z-$R^1CH{=}CHR^2$ (Formula I), wherein $R^1$ and $R^2$ are, C3 perfluoroalkyl groups, and at least one alcohol, halocarbon, fluoroalkyl ethers, hydrofluorocarbon, or alkane and combinations thereof. Examples of $R^1$ and $R^2$ groups include, but are not limited to, n-$C_3F_7$, and i-$C_3F_7$. Exemplary, non-limiting Formula I compounds are presented in Table 1.

TABLE 1

| Code | Structure | IUPAC Name |
|---|---|---|
| F3i3iE | i-$C_3F_7CH{=}CH$-i-$C_3F_7$ | 1,1,1,2,5,6,6,6-octafluoro-2,5-bis(trifluoromethyl)hex-3-ene |
| F33iE | n-$C_3F_7CH{=}CH$-i-$C_3F_7$ | 1,1,1,2,5,5,6,6,7,7,7-undecafluoro-2(trifluoromethyl)hept-3-ene |
| F33E | n-$C_3F_7CH{=}CH$-n-$C_3F_7$ | 1,1,1,2,2,3,3,6,6,7,7,8,8,8-tetradecafluorooct-4-ene |

Compounds of Formula I may be prepared by contacting a perfluoroalkyl iodide of the formula $R^1I$ with a perfluoroalkyltrihydroolefin of the formula $R^2CH{=}CH_2$ to form a trihydroiodoperfluoroalkane of the formula $R^1CH_2CHIR^2$. This trihydroiodoperfluoroalkane can then be dehydroiodinated to form $R^1CH{=}CHR^2$. Alternatively, the olefin $R^1CH{=}CHR^2$ may be prepared by dehydroiodination of a trihydroiodoperfluoroalkane of the formula $R^1CHICH_2R^2$ formed in turn by reacting a perfluoroalkyl iodide of the formula $R^2I$ with a perfluoroalkyltrihydroolefin of the formula $R^1CH{=}CH_2$.

Said contacting of a perfluoroalkyl iodide with a perfluoroalkyltrihydroolefin may take place in batch mode by combining the reactants in a suitable reaction vessel capable of operating under the autogenous pressure of the reactants and products at reaction temperature. Suitable reaction vessels include those fabricated from stainless steels, in particular of the austenitic type, and the well-known high nickel alloys such as Monel® nickel-copper alloys, Hastelloy® nickel based alloys and Inconel® nickel-chromium alloys. Alternatively, the reaction may be conducted in semi-batch mode in which the perfluoroalkyltrihydroolefin reactant is added to the perfluoroalkyl iodide reactant by means of a suitable addition apparatus such as a pump at the reaction temperature.

The ratio of perfluoroalkyl iodide to perfluoroalkyltrihydroolefin should be between about 1:1 to about 4:1, preferably from about 1.5:1 to 2.5:1. Ratios less than 1.5:1 tend to result in large amounts of the 2:1 adduct as reported by Jeanneaux, et. al. in Journal of Fluorine Chemistry, Vol. 4, pages 261-270 (1974).

Temperatures for contacting of said perfluoroalkyl iodide with said perfluoroalkyltrihydroolefin are preferably within the range of about 150° C. to 300° C., more preferably from about 170° C. to about 250° C., and most preferably from about 180° C. to about 230° C. Pressures for contacting of said perfluoroalkyl iodide with said perfluoroalkyltrihydroolefin are preferably the autogenous pressure of the reactants at the reaction temperature.

Suitable contact times for the reaction of the perfluoroalkyl iodide with the perfluoroalkyltrihydroolefin are from about 0.5 hour to 18 hours, preferably from about 4 to about 12 hours.

The trihydroiodoperfluoroalkane prepared by reaction of the perfluoroalkyl iodide with the perfluoroalkyltrihydroolefin may be used directly in the dehydroiodination step or may preferably be recovered and purified by distillation prior to the dehydroiodination step.

In yet another embodiment, the contacting of a perfluoroalkyliodide with a perfluoroalkyltrihydroolefin takes place in the presence of a catalyst. In one embodiment, a suitable catalyst is a Group VIII transition metal complex. Representative Group VIII transition metal complexes include, without limitation, zero valent $NiL_4$ complexes, wherein the ligand, L, can be a phosphine ligand, a phosphite ligand, a carbonyl ligand, an isonitrile ligand, an alkene ligand, or a combination thereof. In one such embodiment, the $Ni(0)L_4$ complex is a $NiL_2(CO)_2$ complex. In one particular embodiment, the Group VIII transition metal complex is bis(triphenyl phosphine)nickel(0) dicarbonyl. In one embodiment, the ratio of perfluoroalkyl iodide to perfluoroalkyltrihydroolefin is between about 3:1 to about 8:1. In one embodiment, the temperature for contacting of said perfluoroalkyl iodide with said perfluoroalkyltrihydroolefin in the presence of a catalyst, is within the range of about 80° C. to about 130° C. In another embodiment, the temperature is from about 90° C. to about 120° C.

In one embodiment, the contact time for the reaction of the perfluoroalkyl iodide with the perfluoroalkyltrihydroolefin in the presence of a catalyst is from about 0.5 hour to about 18 hours. In another embodiment, the contact time is from about 4 to about 12 hours.

The dehydroiodination step is carried out by contacting the trihydroiodoperfluoroalkane with a basic substance. Suitable basic substances include alkali metal hydroxides (e.g., sodium hydroxide or potassium hydroxide), alkali metal oxide (for example, sodium oxide), alkaline earth metal hydroxides (e.g., calcium hydroxide), alkaline earth metal oxides (e.g., calcium oxide), alkali metal alkoxides (e.g., sodium methoxide or sodium ethoxide), aqueous ammonia, sodium amide, or mixtures of basic substances such as soda lime. Preferred basic substances are sodium hydroxide and potassium hydroxide.

Said contacting of the trihydroiodoperfluoroalkane with a basic substance may take place in the liquid phase preferably in the presence of a solvent capable of dissolving at least a portion of both reactants. Solvents suitable for the dehydroiodination step include one or more polar organic solvents such as alcohols (e.g., methanol, ethanol, n-propanol, isopropanol, n-butanol, isobutanol, and tertiary butanol), nitriles (e.g., acetonitrile, propionitrile, butyronitrile, benzonitrile, or adiponitrile), dimethyl sulfoxide, N,N-dimethylformamide, N,N-dimethylacetamide, N-methypyrrolidinone, or sulfolane. The choice of solvent depends on the solubility of the basic substance, the solubility of the perfluoroalkyl iodide, and the solubility of the perfluoroalkyltrihydroolefin as well as the boiling point of the product, and the ease of separation of traces of the solvent from the product during purification. Typically, ethanol or isopropanol are good solvents for the reaction. Separation of solvent from the product may be effected by distillation, extraction, phase separation, or a combination of the three.

Typically, the dehydroiodination reaction may be carried out by addition of one of the reactants (either the basic substance or the trihydroiodoperfluoroalkane) to the other reactant in a suitable reaction vessel. Said reaction vessel may be fabricated from glass, ceramic, or metal and is preferably agitated with an impellor or other stirring mechanism.

Temperatures suitable for the dehydroiodination reaction are from about 10° C. to about 100° C., preferably from about 20° C. to about 70° C. The dehydroiodination reaction may be carried out at ambient pressure or at reduced or elevated pressure. Of note are dehydroiodination reactions in which the compound of Formula I is distilled out of the reaction vessel as it is formed.

Alternatively, the dehydroiodination reaction may be conducted by contacting an aqueous solution of said basic substance with a solution of the trihydroiodoperfluoroalkane in one or more organic solvents of lower polarity such as an alkane (e.g., hexane, heptane, or octane), aromatic hydrocarbon (e.g., toluene), halogenated hydrocarbon (e.g., methylene chloride, carbon tetrachloride, or tetrachloroethylene), or ether (e.g., diethyl ether, methyl tert-butyl ether, tetrahydrofuran, 2-methyl tetrahydrofuran, dioxane, dimethoxyethane, diglyme, or tetraglyme) in the presence of a phase transfer catalyst. Suitable phase transfer catalysts include quaternary ammonium halides (e.g., tetrabutylammonium bromide, tetrabutylammonium hydrosulfate, triethylbenzylammonium chloride, dodecyltrimethylammonium chloride, and tricaprylylmethylammonium chloride), quaternary phosphonium halides (e.g., triphenylmethylphosphonium bromide and tetraphenylphosphonium chloride), cyclic ether compounds known in the art as crown ethers (e.g., 18-crown-6 and 15-crown-5).

Alternatively, the dehydroiodination reaction may be conducted in the absence of solvent by adding the trihydroiodoperfluoroalkane to one or more solid or liquid basic substance(s).

Suitable reaction times for the dehydroiodination reactions are from about 15 minutes to about six hours or more depending on the solubility of the reactants. Typically the dehydroiodination reaction is rapid and requires about 30 minutes to about three hours for completion.

The compound of formula I may be recovered from the dehydroiodination reaction mixture by phase separation, optionally after addition of water, by distillation, or by a combination thereof.

In another embodiment, compounds of Formula I may also be prepared by contacting a compound of the formula E- or Z—$R^1CCl{=}CClR^2$ (Formula II), where $R^1$ and $R^2$ are as defined above, with a reducing agent. This route is especially useful when both $R^1$ and $R^2$ are n-$C_3F_7$. The Formula II compound, E/Z-n-$C_3F_7CCl{=}CCl$-n-$C_3F_7$, may be prepared by the methods disclosed by Krespan in U.S. Pat. No. 5,162,594 and Journal of Fluorine Chemistry, Volume 77, pages 117-126 (1996) the teachings of which are incorporated by reference.

Suitable reducing agents for conversion of compounds of Formula II to compounds of Formula I include organotin hydrides such as diphenyltin dihydride, triphenyltin hydride, tributyltin hydride, dibutylin dihydride, and the like. In one embodiment, the organotin hydride is tri-n-butyltin hydride (tributylstannane) which is available from several commercial sources. Use of organotin hydrides (i.e., stannanes) as reducing agents in organic chemistry is discussed by Hudlicky in Reductions in Organic Chemistry, Ellis Horwood, Chichester, UK, 1984.

In one embodiment, said contacting of a Formula II compound with an organotin hydride such as tri-n-butyltin hydride may take place in batch mode by combining the reactants in a suitable reaction vessel capable of operating under the autogenous pressure of the reactants and products at reaction temperature. Suitable reaction vessels include those fabricated from glass, ceramic, or stainless steel. In another embodiment, the reaction is conducted in semi-batch mode in which the compound of Formula II is added to the organotin hydride reactant by means of a suitable addition apparatus such as a pump at the reaction temperature. Alternatively, the organotin hydride may be added to the compound of Formula II.

In one embodiment, the molar ratio of organotin hydride to compound of Formula II is between about 1:1 to about 3:1. In another embodiment, the molar ratio of orgaontin hydride to compound of Formula II is from about 2:1 to about 2.5:1. Ratios less than 2:1 tend to result in formation of intermediate compounds E- or Z—$R^1CCl{=}CHR^2$ (Formula III) or E- or Z—$R^1CH{=}CClR^2$ (Formula IIIa) where $R^1$ and $R^2$ are as defined above. Said Formula III compounds, if formed intentionally or as reaction by-products, may be converted to compounds of Formula I by reaction with additional amounts of organotin hydrides.

In one embodiment, temperatures for contacting of said Formula II compounds (or Formula III/IIIa compounds) with said organotin hydrides are within the range of about 30° C. to 150° C. In another embodiment, temperatures for contacting of said Formula II compounds (or Formula III/IIIa compounds) with said organotin hydrides are from about 40° C. to about 120° C. In yet another embodiment, temperatures for contacting of said Formula II compounds (or Formula III/IIIa compounds) with said organotin hydrides are from about 50° C. to about 100° C. The reactions are typically carried out at atmospheric pressure.

In one embodiment, suitable contact times for the reaction of the Formula II compounds (or Formula III/IIIa compounds) with said organotin hydrides are from about 0.5 hour to 18 hours. In another embodiment, suitable contact times for the reaction of the Formula II compounds (or Formula III/IIIa compounds) with said organotin hydrides are from about 1 to about 10 hours.

The reaction of the Formula II compound with the organotin hydrides may be carried out in the absence or presence of a free radical initiator compound or in the presence of ultraviolet light. Suitable free radical initiators include peroxides such as benzoyl peroxide or t-butyl peroxide, or azo compounds such as AIBN. Use of such initiators for organotin hydride reductions is well known in the art of organic synthesis. If the reaction of the Formula II compound with the organotin hydrides is conducted in the absence of an initiator, the main product is typically the compounds of Formula III or IIIc. If the reaction of the Formula II compound with the organotin hydride is conducted in the presence of an initiator, the main product is typically the Formula I compound. Reaction of Formula III or IIIa compounds with organotin hydrides in the presence of an initiator gives the corresponding Formula I compound.

In one embodiment, the reaction of the Formula II compounds with the organotin hydrides is conducted in the absence of solvent. In another embodiment, a solvent such as a compound of Formula I or an ether such as tetrahydrofuran, 2-methyl tetrahydrofuran, glyme, or diglyme may be employed.

In one embodiment, the compounds of Formula I or Formula III may be recovered from the reaction mixtures by phase separation since the organotin chloride by-product has little solubility in the products. In another embodiment, the Formula I compounds may be recovered by distillation from the reaction mixture at atmospheric pressure or optionally under vacuum, or by a combination of phase separation and distillation.

In yet another embodiment, the invention relates to a process for cleaning surfaces using azeotropic or azeotrope-like compositions comprising a fluorinated olefin and at least one compound selected from the group consisting of alcohols, halocarbons, fluoroalkyl ethers, hydrofluorocarbons, and alkanes.

In one embodiment, the fluoroolefins of Table 1 are combined with the compounds listed in Table 2 to form the present inventive compositions.

TABLE 2

| Name | Chemical formula | Synonym (or abbreviation) | CAS registry number |
|---|---|---|---|
| | Halocarbons | | |
| n-propylbromide | $CH_3CH_2CH_2Br$ | nPBr | |
| trans-1,2-dichloroethylene | $CHCl{=}CHCl$ | t-DCE | 156-60-5 |
| cis-1,2-dichloroethylene | $CHCl{=}CHCl$ | c-DCE | 156-59-2 |
| | Alcohols | | |
| methanol | $CH_3OH$ | MeOH | 67-56-1 |
| ethanol | $CH_3CH_2OH$ | EtOH | 64-17-5 |
| n-propanol | $CH_3CH_2CH_2OH$ | n-PrOH | 71-23-8 |
| isopropanol | $CH_3CH(OH)CH_3$ | IPA | 67-63-0 |
| | Fluoroethers | | |
| mixture of isomers - 1,1,1,2,2,3,3,4,4-nonafluoro-4-methoxybutane and 2-(methoxy-difluoromethyl)-1,1,1,2,3,3,3-heptafluoropropane | $CF_3CF_2CF_2CF_2OCH_3$ and $(CF_3)_2CFCF_2OCH_3$ | $C_4F_9OCH_3$ | 163702-07-6 and 163702-08-7 |

TABLE 2-continued

| Name | Chemical formula | Synonym (or abbreviation) | CAS registry number |
|---|---|---|---|
| mixture of isomers - 1-ethoxy-1,1,2,2,3,3,4,4,4-nonafluorobutane and 2-(ethoxy-difluoromethyl)-1,1,1,2,3,3,3-heptafluoropropane | $CF_3CF_2CF_2CF_2OC_2H_5$ and $(CF_3)_2CFCF_2OC_2H_5$ | $C_4F_9OC_2H_5$ | 163702-05-4 and 163702-06-5 |
| Hydrofluorocarbons | | | |
| 1,1,1,2,3,4,4,5,5,5-decafluoropentane | $CF_3CHFCHFCF_2CF_3$ | HFC-43-10mee | |
| 1,1,1,3,3-pentafluorobutane | $CF_3CH_2CF_2CH_3$ | HFC-365mfc | |
| Alkanes | | | |
| Heptane | $CH_3(CH_2)_5CH_3$ | Hept | 142-82-5 |

The compounds listed in Table 2 are commercially available from chemical supply houses. $C_4F_9OCH_3$, and $C_4F_9OC_2H_5$ are available from 3M™ (St. Paul, Minn.). HFC-43-10mee is available from E.I. DuPont de Nemours & Co (Wilmington, Del.). HFC-365mfc is available from Solvay-Solexis. As used herein, trans-1,2-dichloroethylene is intended to refer to mixtures containing up to about 20% by weight of cis-1,2-dichloroethylene.

The compositions of the present invention may be prepared by any convenient method by combining the desired amounts of the individual components. A preferred method is to weigh the desired component amounts and thereafter combining the components in an appropriate vessel. Agitation may be used, if desired.

In one embodiment, the compositions of the present invention comprise compositions containing one of the fluoroolefins listed in Table 1 and at least one of the compounds selected from the group consisting of: trans-1,2-dichloroethylene; cis-1,2-dichloroethylene, n-propylbromide; methanol; ethanol; n-propanol; isopropanol; $C_4F_9OCH_3$; $C_4F_9OC_2H_5$; HFC-43-10mee; HFC-365mfc; heptane; and combinations thereof. In one embodiment, the compositions are azeotropic or azeotrope-like.

As used herein, an azeotropic composition is a constant boiling liquid admixture of two or more substances wherein the admixture distills without substantial composition change and behaves as a constant boiling composition. Constant boiling compositions, which are characterized as azeotropic, exhibit either a maximum or a minimum boiling point, as compared with that of the non-azeotropic mixtures of the same substances. Azeotropic compositions as used herein include homogeneous azeotropes which are liquid admixtures of two or more substances that behave as a single substance, in that the vapor, produced by partial evaporation or distillation of the liquid, has the same composition as the liquid. Azeotropic compositions as used herein also include heterogeneous azeotropes where the liquid phase splits into two or more liquid phases. In these embodiments, at the azeotropic point, the vapor phase is in equilibrium with two liquid phases and all three phases have different compositions. If the two equilibrium liquid phases of a heterogeneous azeotrope are combined and the composition of the overall liquid phase calculated, this would be identical to the composition of the vapor phase.

As used herein, the term "azeotrope-like composition" also sometimes referred to as "near azeotropic composition," means a constant boiling, or substantially constant boiling liquid admixture of two or more substances that behaves as a single substance. One way to characterize an azeotrope-like composition is that the vapor produced by partial evaporation or distillation of the liquid has substantially the same composition as the liquid from which it was evaporated or distilled. That is, the admixture distills/refluxes without substantial composition change. Another way to characterize an azeotrope-like composition is that the bubble point vapor pressure of the composition and the dew point vapor pressure of the composition at a particular temperature are substantially the same. Herein, a composition is azeotrope-like if, after 50 weight percent of the composition is removed such as by evaporation or boiling off, the difference in vapor pressure between the original composition and the composition remaining after 50 weight percent of the original composition has been removed by evaporation or boil off is less than 10 percent.

In cleaning apparati, such as vapor degreasers or defluxers, some loss of the cleaning compositions may occur during operation through leaks in shaft seals, hose connections, soldered joints and broken lines. In addition, the working composition may be released to the atmosphere during maintenance procedures on equipment. If the composition is not a pure compound or azeotropic or azeotrope-like composition, the composition may change when leaked or discharged to the atmosphere from the equipment, which may cause the composition remaining in the equipment to become flammable or to exhibit unacceptable performance. Accordingly, it is desirable to use as a cleaning composition a single fluorinated hydrocarbon or an azeotropic or azeotrope-like composition that fractionates to a negligible degree upon leak or boil-off.

The azeotropic compositions of one embodiment of the present invention are listed in Table 3.

TABLE 3

| Comp A | Comp B | wt % A | wt % B | T(C.) |
|---|---|---|---|---|
| F33E | methanol | 79.3 | 20.7 | 58.4 |
| F33E | isopropanol | 79.8 | 20.2 | 70.3 |
| F33E | ethanol | 81.5 | 18.5 | 67.6 |
| F33E | t-DCE | 30.9 | 69.1 | 44.5 |
| F33E | nPBr | 51.8 | 48.2 | 62.9 |
| F33E | c-DCE | 45.4 | 54.6 | 54.5 |
| F33E | Hept | 74.8 | 25.2 | 89.8 |

Additionally in another embodiment, the azeotropic compositions of the present invention may include ternary and quaternary azeotropic compositions comprising compounds from Table 2. Examples without limitation of these higher order azeotropic compositions are exemplified in Table 4 along with the atmospheric pressure boiling points for the compositions.

TABLE 4

| Comp A | Comp B | Comp C | wt % A | wt % B | wt % C | T(C) |
|---|---|---|---|---|---|---|
| F33E | t-DCE | methanol | 30.2 | 62.1 | 7.7 | 38.8 |
| F33E | t-DCE | ethanol | 31.4 | 64.4 | 4.2 | 43.1 |

In another embodiment, the binary azeotrope-like compositions of the present invention are listed in Table 5.

TABLE 5

| Comp A | Comp B | wt % A | wt % B | T(C.) |
|---|---|---|---|---|
| F33E | Methanol | 63-94 | 6-37 | 58.4 |
| F33E | Isopropanol | 60-93 | 7-40 | 70.3 |
| F33E | Ethanol | 64-94 | 6-36 | 67.6 |
| F33E | t-DCE | 17-73 | 37-83 | 44.5 |
| F33E | nPBr | 32-80 | 20-68 | 62.9 |
| F33E | $C_4F_9OC_2H_5$ | 1-53 | 47-99 | 50 |
| F33E | $C_4F_9OC_2H_5$ | 86-99 | 1-14 | 50 |
| F33E | c-DCE | 28-79 | 21-72 | 54.5 |
| F33E | Hept | 1-99 | 1-99 | 89.8 |

In yet another embodiment, in addition to the binary azeotrope-like compositions in the preceding table, higher order (ternary or quaternary) azeotrope-like compositions are included in the present invention. Examples without limitation of ternary or higher order azeotrope-like compositions are given in Table 6.

TABLE 6

| Comp A | Comp B | Comp C | wt % A | wt % B | wt % C | T(C) |
|---|---|---|---|---|---|---|
| F33E | t-DCE | $C_4F_9OCH_3$ | 1-70 | 30-80 | 1-70 | 50 |
| F33E | t-DCE | $C_4F_9OC_2H_5$ | 1-70 | 30-80 | 1-70 | 50 |
| F33E | t-DCE | 43-10mee | 1-70 | 20-60 | 1-80 | 50 |
| F33E | t-DCE | 365mfc | 1-60 | 10-60 | 1-80 | 50 |
| F33E | t-DCE | Methanol | 1-70 | 30-85 | 1-30 | 38.8 |
| F33E | t-DCE | ethanol | 1-70 | 30-85 | 1-25 | 43.1 |
| F33E | t-DCE | c-DCE | 1-80 | 1-95 | 1-99 | |

In yet another embodiment of the invention, the compositions of the present invention may further comprise an aerosol propellant. Aerosol propellants may assist in delivering the present compositions from a storage container to a surface in the form of an aerosol. Aerosol propellant is optionally included in the present compositions in up to 25 weight percent of the total composition. Representative aerosol propellants comprise air, nitrogen, carbon dioxide, difluoromethane (HFC-32, $CH_2F_2$), trifluoromethane (HFC-23, $CHF_3$), difluoroethane (HFC-152a, $CHF_2CH_3$), trifluoroethane (HFC-143a, $CH_3CF_3$; or HFC-143, $CHF_2CH_2F$), tetrafluoroethane (HFC-134a, $CF_3CH_2F$; HFC-134, $CHF_2CHF_2$), pentafluoroethane (HFC-125, $CF_3CHF_2$), hexafluoropropane (HFC-236ea, $CF_3CHFCHF_2$; HFC-236fa, $CF_3CH_2CF_3$; HFC-236cb, $CF_3CF_2CH_2F$), heptafluoropropane (HFC-227ea, $CF_3CHFCF_3$), pentafluoropropane (HFC-245fa, $CF_3CH_2CHF_2$), n-butane, iso-butane, propane, dimethyl ether ($CH_3OCH_3$), or mixtures thereof.

In an embodiment of the invention, the present inventive azeotropic compositions are effective cleaning agents, defluxers and degreasers. In particular, the present inventive azeotropic compositions are useful when de-fluxing circuit boards with components such as Flip chip, μBGA (ball grid array), and Chip scale or other advanced high-density packaging components. Flip chips, μBGA, and Chip scale are terms that describe high density packaging components used in the semi-conductor industry and are well understood by those working in the field.

In another embodiment the present invention relates to a process for removing residue from a surface or substrate, comprising: contacting the surface or substrate with a composition of the present invention and recovering the surface or substrate from the composition.

In a process embodiment of the invention, the surface or substrate may be an integrated circuit device, in which case, the residue comprises rosin flux or oil. The integrated circuit device may be a circuit board with various types of components, such as Flip chips, μBGAs, or Chip scale packaging components. The surface or substrate may additionally be a metal surface such as stainless steel. The rosin flux may be any type commonly used in the soldering of integrated circuit devices, including but not limited to RMA (rosin mildly activated), RA (rosin activated), WS (water soluble), and OA (organic acid). Oil residues include but are not limited to mineral oils, motor oils, and silicone oils.

In the inventive process, the means for contacting the surface or substrate is not critical and may be accomplished by immersion of the device in a bath containing the composition, spraying the device with the composition or wiping the device with a substrate that has been wet with the composition. Alternatively, the composition may also be used in a vapor degreasing or defluxing apparatus designed for such residue removal. Such vapor degreasing or defluxing equipment is available from various suppliers such as Forward Technology (a subsidiary of the Crest Group, Trenton, N.J.), Trek Industries (Azusa, Calif.), and Ultronix, Inc. (Hatfield, Pa.) among others.

An effective composition for removing residue from a surface would be one that had a Kauri-Butanol value (Kb) of at least about 10, preferably about 40, and even more preferably about 100. The Kauri-Butanol value (Kb) for a given composition reflects the ability of said composition to solubilize various organic residues (e.g., machine and conventional refrigeration lubricants). The Kb value may be determined by ASTM D-1133-94.

The following specific examples are meant to merely illustrate the invention, and are not meant to be limiting in any way whatsoever.

EXAMPLES

Example 1

Impact of Vapor Leakage

A vessel is charged with an initial composition at a specified temperature, and the initial vapor pressure of the composition is measured. The composition is allowed to leak from the vessel, while the temperature is held constant, until 50 weight percent of the initial composition is removed, at which time the vapor pressure of the composition remaining in the vessel is measured. Results are summarized in Table 7 below.

TABLE 7

| Compounds wt % A/ wt % B | Initial Psia | Initial kPa | After 50% Leak Psia | After 50% Leak kPa | Delta P % |
|---|---|---|---|---|---|
| F33E/methanol (58.4° C.) | | | | | |
| 79.3/20.7 | 14.70 | 101.35 | 14.70 | 101.35 | 0.0% |
| 90/10 | 14.70 | 101.35 | 14.70 | 101.35 | 0.0% |
| 94/6 | 14.69 | 101.28 | 14.69 | 101.28 | 0.0% |
| 70/30 | 14.70 | 101.35 | 14.70 | 101.35 | 0.0% |
| 63/37 | 14.70 | 101.35 | 14.70 | 101.35 | 0.0% |
| F33E/ethanol (67.6° C.) | | | | | |
| 81.5/18.5 | 14.68 | 101.22 | 14.68 | 101.22 | 0.0% |
| 90/10 | 14.68 | 101.22 | 14.68 | 101.22 | 0.0% |
| 93/7 | 14.68 | 101.22 | 14.68 | 101.22 | 0.0% |
| 94/6 | 14.68 | 101.22 | 14.64 | 100.94 | 0.3% |
| 70/30 | 14.68 | 101.22 | 14.68 | 101.22 | 0.0% |
| 65/35 | 14.68 | 101.22 | 14.68 | 101.22 | 0.0% |
| 64/36 | 14.68 | 101.22 | 14.68 | 101.22 | 0.0% |
| F33E/isopropanol (70.3° C.) | | | | | |
| 79.8/20.2 | 14.71 | 101.42 | 14.71 | 101.42 | 0.0% |
| 90/10 | 14.71 | 101.42 | 14.71 | 101.42 | 0.0% |

TABLE 7-continued

| Compounds wt % A/ wt % B | Initial Psia | Initial kPa | After 50% Leak Psia | After 50% Leak kPa | Delta P % |
|---|---|---|---|---|---|
| 93/7 | 14.71 | 101.42 | 14.65 | 101.01 | 0.4% |
| 65/35 | 14.71 | 101.42 | 14.71 | 101.42 | 0.0% |
| 61/39 | 14.71 | 101.42 | 14.71 | 101.42 | 0.0% |
| 60/40 | 14.71 | 101.42 | 13.96 | 96.25 | 5.1% |
| F33E/t-dce (44.5° C.) | | | | | |
| 30.9/69.1 | 14.71 | 101.42 | 14.71 | 101.42 | 0.0% |
| 50/50 | 14.70 | 101.35 | 14.65 | 101.01 | 0.3% |
| 60/40 | 14.67 | 101.15 | 14.47 | 99.77 | 1.4% |
| 70/30 | 14.59 | 100.60 | 13.73 | 94.67 | 5.9% |
| 73/37 | 14.54 | 100.25 | 13.15 | 90.67 | 9.6% |
| 74/36 | 14.52 | 100.11 | 12.88 | 88.81 | 11.3% |
| 20/80 | 14.71 | 101.42 | 14.69 | 101.28 | 0.1% |
| 17/83 | 14.71 | 101.42 | 13.42 | 92.53 | 8.8% |
| F33E/n-propyl bromide (62.9° C.) | | | | | |
| 51.8/48.2 | 14.71 | 101.42 | 14.71 | 101.42 | 0.0% |
| 70/30 | 14.69 | 101.28 | 14.61 | 100.73 | 0.5% |
| 80/20 | 14.64 | 100.94 | 13.30 | 91.70 | 9.2% |
| 81/19 | 14.63 | 100.87 | 12.69 | 87.50 | 13.3% |
| 40/60 | 14.71 | 101.42 | 14.70 | 101.35 | 0.1% |
| 35/65 | 14.71 | 101.42 | 14.70 | 101.35 | 0.1% |
| 33/67 | 14.70 | 101.35 | 14.69 | 101.28 | 0.1% |
| 32/68 | 14.70 | 101.35 | 14.67 | 101.15 | 0.2% |
| F33E/HFE-7200 (50° C.) | | | | | |
| 1/99 | 5.96 | 41.09 | 5.95 | 41.02 | 0.2% |
| 10/90 | 5.75 | 39.65 | 5.66 | 39.02 | 1.6% |
| 20/80 | 5.51 | 37.99 | 5.32 | 36.68 | 3.4% |
| 40/60 | 4.97 | 34.27 | 4.60 | 31.72 | 7.4% |
| 50/50 | 4.67 | 32.20 | 4.23 | 29.17 | 9.4% |
| 53/47 | 4.57 | 31.51 | 4.12 | 28.41 | 9.8% |
| 54/46 | 4.54 | 31.30 | 4.08 | 28.13 | 10.1% |
| 85/15 | 3.37 | 23.24 | 3.02 | 20.82 | 10.4% |
| 86/14 | 3.32 | 22.89 | 2.99 | 20.62 | 9.9% |
| 90/10 | 3.14 | 21.65 | 2.88 | 19.86 | 8.3% |
| 99/1 | 2.71 | 18.68 | 2.67 | 18.41 | 1.5% |
| 1/99 | 5.96 | 41.09 | 5.95 | 41.02 | 0.2% |
| 10/90 | 5.75 | 39.65 | 5.66 | 39.02 | 1.6% |
| 20/80 | 5.51 | 37.99 | 5.32 | 36.68 | 3.4% |
| F33E/cis-Dce (54.5° C.) | | | | | |
| 45.4/54.6 | 14.69 | 101.28 | 14.69 | 101.28 | 0.0% |
| 40/60 | 14.69 | 101.28 | 14.69 | 101.28 | 0.0% |
| 35/65 | 14.69 | 101.28 | 14.68 | 101.22 | 0.1% |
| 30/70 | 14.68 | 101.22 | 14.68 | 101.22 | 0.0% |
| 29/71 | 14.68 | 101.22 | 14.68 | 101.22 | 0.0% |
| 28/72 | 14.68 | 101.22 | 14.67 | 101.15 | 0.1% |
| 60/40 | 14.68 | 101.22 | 14.66 | 101.08 | 0.1% |
| 70/30 | 14.66 | 101.08 | 14.48 | 99.84 | 1.2% |
| 75/25 | 14.63 | 100.87 | 14.14 | 97.49 | 3.3% |
| 79/21 | 14.59 | 100.60 | 13.29 | 91.63 | 8.9% |
| 80/20 | 14.58 | 100.53 | 12.86 | 88.67 | 11.8% |
| F33E/heptane (89.8° C.) | | | | | |
| 74.8/25.2 | 14.68 | 101.22 | 14.68 | 101.22 | 0.0% |
| 90/10 | 14.11 | 97.29 | 13.65 | 94.11 | 3.3% |
| 95/5 | 13.26 | 91.43 | 12.57 | 86.67 | 5.2% |
| 99/1 | 11.86 | 81.77 | 11.56 | 79.70 | 2.5% |
| 60/40 | 14.49 | 99.91 | 14.27 | 98.39 | 1.5% |
| 50/50 | 14.21 | 97.98 | 13.66 | 94.18 | 3.9% |
| 30/70 | 13.38 | 92.25 | 12.26 | 84.53 | 8.4% |
| 20/80 | 12.82 | 88.39 | 11.78 | 81.22 | 8.1% |
| 10/90 | 12.14 | 83.70 | 11.49 | 79.22 | 5.4% |
| 1/99 | 11.41 | 78.67 | 11.34 | 78.19 | 0.6% |

Example 2

Preparation of 1,1,1,2,2,3,3,6,6,7,7,8,8,8-Tetradecafluoro-4-octene

A mixture of E- and Z-4,5-dichloro-1,1,1,2,2,3,3,6,6,7,7,8,8,8-tetradecafluoro-4-octene was prepared by reacting 2,3-dichloro-1,1,1,4,4,4-hexafluoro-2-butene (69.6 g, 0.300 mole) with tetrafluoroethylene (65 g, 0.65 mole) in the presence of 4 g of aluminum chlorofluoride at 85° C. as disclosed by Krespan in U.S. Pat. No. 5,162,594. The resulting reaction mixture was twice distilled (120-124 mBar, head temperature 80-81° C.) to give E/Z-4,5-dichloro-1,1,1,2,2,3,3,6,6,7,7,8,8,8-tetradecafluoro-4-octene having GC purity of 97%.

A 500 mL three neck flask containing a poly(tetrafluoroethylene)-coated stirring bar and equipped with a condenser, addition funnel, and thermocouple well was charged with tri-n-butyltin hydride (135.0 g, 0.463 mole). The flask was purged with nitrogen and heated to 71° C. E/Z-4,5-Dichloro-1,1,1,2,2,3,3,6,6,7,7,8,8,8-tetradecafluoro-4-octene (100.0 g, 0.231 mole) was then added to the flask via the addition funnel over the course of 1.5 hours; the temperature rose to a maximum of 95° C. during this time. After the addition was complete, the mixture was heated for an additional 1.5 h at 93-96° C.

After cooling, the lower layer was collected, washed with 3N HCl and aqueous phosphate buffer, and dried over molecular sieves. The product (76.7 g) was analyzed by gas chromatography and determined to contain 1,1,1,2,2,3,3,6,6,7,7,8,8,8-tetradecafluoro-4-octene (23.8%) and 4-chloro-1,1,1,2,2,3,3,6,6,7,7,8,8,8-tetradecafluoro-4-octene (61.8%). This product was distilled at atmospheric pressure using a twelve inch packed column to give 1,1,1,2,2,3,3,6,6,7,7,8,8,8-tetradecafluoro-4-octene (head temperature 93.8-96° C., 93% purity) and 4-chloro-1,1,1,2,2,3,3,6,6,7,7,8,8,8-tetradecafluoro-4-octene (head temperature 110-119° C., 97% purity). 1,1,1,2,2,3,3,6,6,7,7,8,8,8-Tetradecafluoro-4-octene: $^{1}$H NMR ($CDCl_3$): δ 6.49 (m, =CH) $^{19}$F NMR ($CDCl_3$): δ −82.95 (t, J=9.3 Hz, —$CF_3$), −117.44 (m, —$CF_2$—), −130.13 (br, —$CF_2$—). 4-Chloro-1,1,1,2,2,3,3,6,6,7,7,8,8,8-tetradecafluoro-4-octene: $^{1}$H NMR ($CDCl_3$): δ 6.54 (t, J=12.4 Hz, =CH)

$^{19}$F NMR ($CDCl_3$): δ 81.03 (t, J=8.7 Hz, —$CF_3$), −81.07 (t, J=9.2 Hz, —$CF_3$), −111.84 (m, —$CF_2$—), −113.09 (m, —$CF_2$—), −125.77 (br, —$CF_2$—), −128.16 (br, —$CF_2$—).

Conversion of 4-Chloro-1,1,1,2,2,3,3,6,6,7,7,8,8,8-tetradecafluoro-4-octene to 1,1,1,2,2,3,3,6,6,7,7,8,8,8-Tetradecafluoro-4-octene A 210 mL Hastelloy™ C tube was charge with -chloro-1,1,1,2,2,3,3,6,6,7,7,8,8,8-tetradecafluoro-4-octene (40.0 g, 0.0924 mole), tri-n-butyltin hydride (35.0 g, 0.12 mole), and t-butylperoxide (1.46 g, 0.010 mole). The tube was sealed, cooled in dry ice, evacuated, and purged with nitrogen. The tube was the shaken at 130-131.5° C. for 4 hours. After discharging the tube, analysis of the bottom layer by gas chromatography indicated almost complete conversion to 1,1,1,2,2,3,3,6,6,7,7,8,8,8-tetradecafluoro-4-octene.

Example 3

De-Fluxing

The compositions of the present invention are effective for cleaning ionic contamination (flux residue) from a surface. The test used to determine surface cleanliness involved the following steps:

1. A rosin flux is painted liberally onto a FR-4 test board (an epoxy printed wiring board with tracing made of tinned copper).
2. The board so treated is then heated in an oven at about 175° C. for about 1-2 minutes to activate the rosin flux.
3. The board is then immersed in solder (Sn63, a 63/37 Sn/lead solder) at about 200° C. for about 10 seconds.

4. The board is then cleaned by immersion in the boiling cleaning composition for about 3 minutes and providing gentle movement of the board. The board is then immersed in a fresh, room temperature bath of cleaning composition to rinse for about 2 minutes.
5. The board is then tested for residual ionics with an Omega Meter 600 SMD ionic analyzer.

The cleaning performance is determined by weighing the board prior to deposition of the flux, after the deposition of the flux and then after the cleaning procedure. The results are given in Table 8.

TABLE 8

| Composition (wt %) | Dry weight (grams) | Wet weight (grams) | Post dry weight (grams) | % soil removed |
|---|---|---|---|---|
| F33E/tDCE/ | 21.3167 | 21.7076 | 21.3326 | 96 |
| MeOH (30/ | 21.1015 | 21.5107 | 21.1178 | 96 |
| 63/7) | 20.8923 | 21.2849 | 20.9120 | 95 |
| | | Average | | 96 |

Example 4

Metal Cleaning

Stainless steel (type 316) 2"×3" coupons that have been grit blasted to provide an unpolished surface are pre-cleaned and oven dried to remove any residual soil. The tare weight of each coupon is determined to 0.1 mg. A small amount of mineral oil is applied with a swab, the coupon is then re-weighed to obtain the "loaded" weight. The coupon is then cleaned by immersion into a boiling cleaning composition for 1 minute, held in vapor for 30 seconds and then air dried for 1 minute. The coupon is then re-weighed and the percent of soil removed calculated using the 3 recorded weights. The results are shown in Table 9.

TABLE 9

| Composition (wt %) | Dry weight (grams) | Wet weight (grams) | Post Dry weight (grams) | Percent Soil removed |
|---|---|---|---|---|
| F33E/tDCE | 20.9610 | 21.3214 | 20.9615 | 99.9 |
| (31/69) | 20.9158 | 21.2966 | 20.9162 | 99.9 |
| | 21.2304 | 21.5944 | 20.2306 | 99.9 |
| | | Average | | 99.9 |

The results show efficient removal of mineral oil residue from stainless steel surfaces by the compositions of the present invention.

Example 5

Metal Cleaning

Stainless steel (type 316) 2"×3" coupons that have been grit blasted to provide an unpolished surface are pre-cleaned and oven dried to remove any residual soil. The tare weight of each coupon is determined to 0.1 mg. A small amount of DC 200 Silicone is applied with a swab, the coupon is then re-weighed to obtain the "loaded" weight. The coupon is then cleaned by immersion into a boiling cleaning composition for 1 minute, held in vapor for 30 seconds and then air dried for 1 minute. The coupon is then weighed and the percent of soil removed is calculated using the 3 recorded weights. The results are shown in Table 10.

TABLE 10

| Composition (wt %) | Dry weight (grams) | Wet weight (grams) | Post Dry weight (grams) | Percent Soil removed |
|---|---|---|---|---|
| F33E/tDCE | 21.0164 | 21.4317 | 21.0167 | 99.9 |
| (31/69) | 21.1241 | 21.5320 | 21.1244 | 99.9 |
| | 20.9163 | 21.3241 | 21.9166 | 99.9 |
| | | Average | | 99.9 |

The results show efficient removal of silicone residue from stainless steel surfaces by the compositions of the present invention.

Example 6

Metal Cleaning Efficacy

Stainless steel (type 316) 2"×3" coupons that have been grit blasted to provide an unpolished surface are pre-cleaned and oven dried to remove any residual soil. Each coupon is weighed to 4 places to obtain a tare weight. A small amount of mineral oil is applied with a swab, the coupon is then weighed to obtain the "loaded" weight. The coupon is then cleaned by immersion into a boiling cleaning composition for 1 minute, held in vapor for 30 seconds and then air dried for 1 minute. The coupon is then weighed and the percent of soil removed is calculated using the 3 recorded weights. The results are shown in Table 11.

TABLE 11

| Composition (wt %) | Dry weight (grams) | Wet weight (grams) | Post Dry weight (grams) | Percent Soil removed |
|---|---|---|---|---|
| F33E/MeOH | 21.2131 | 21.6412 | 21.2473 | 92.0 |
| (79/21) | 21.1269 | 21.5484 | 21.1572 | 92.8 |
| | 20.9140 | 21.3713 | 20.9497 | 92.2 |
| | | Average | | 92.3 |

The results show efficient removal of mineral oil residue from stainless steel surfaces by the compositions of the present invention.

Example 7

Metal Cleaning Efficacy

Stainless steel (type 316) 2"×3" coupons that have been grit blasted to provide an unpolished surface are pre-cleaned and oven dried to remove any residual soil. Each coupon is weighed to 4 places to obtain a tare weight. A small amount of DC 200 Silicone is applied with a swab, the coupon is then weighed to obtain the "loaded" weight. The coupon is then cleaned by immersion into a boiling cleaning composition for 1 minute, held in vapor for 30 seconds and then air dried for 1 minute. The coupon is then weighed and the percent of soil removed is calculated using the 3 recorded weights. The results are shown in Table 12.

TABLE 12

| Composition (wt %) | Dry weight (grams) | Wet weight (grams) | Post Dry weight (grams) | Percent Soil removed |
|---|---|---|---|---|
| F33E/MeOH | 21.3129 | 21.7063 | 21.3171 | 98.9 |
| (79/21) | 21.1472 | 21.5287 | 21.1510 | 99.0 |
| | 20.9149 | 21.2972 | 20.9345 | 94.9 |
| | | Average | | 97.6 |

Example 8

A mixture of 26.8% F33E and 73.2% 1,2-trans-dichloroethylene (t-DCE) by weight is prepared and placed into a 5-plate distillation apparatus, with a 10:1 reflux ratio. The temperature at the distillation head is recorded and several cuts of the distilled material are removed over time. Distilled material is analyzed by gas chromatography. Data is shown in table 13 below. Composition and temperature remained stable throughout the experiment, indicating azeotropic behavior of this mixture.

TABLE 13

| Distillation cut | Head temp (C.) | Wt % distilled | % F33E | % t-DCE |
|---|---|---|---|---|
| 1 | 44 | 5 | 30.5 | 69.5 |
| 2 | 44.2 | 15 | 30.4 | 69.6 |
| 3 | 44.3 | 32 | 30.8 | 69.2 |
| 4 | 44.5 | 50 | 30.9 | 69.1 |

Example 9

A mixture of 26.0% F33E, 69.8% 1,2-trans-dichloroethylene (t-DCE) and 4.2% ethanol by weight is prepared and placed into a 5-plate distillation apparatus, with a 10:1 reflux ratio. The temperature at the distillation head is recorded and several cuts of the distilled material are removed over time. Distilled material was analyzed by gas chromatography. Data is shown in table 14 below. Composition and temperature remained stable throughout the experiment, indicating azeotropic behavior of this mixture.

TABLE 14

| Distillation cut | Head temp (C.) | Wt % distilled | % F33E | % t-DCE | % EtOH |
|---|---|---|---|---|---|
| 1 | 42.9 | 8 | 31.2 | 64.5 | 4.3 |
| 2 | 42.9 | 13 | 31.1 | 64.4 | 4.5 |
| 3 | 42.9 | 19 | 31.4 | 64.3 | 4.3 |
| 4 | 43.0 | 26 | 31.6 | 64.6 | 4.2 |
| 5 | 43.1 | 35 | 31.4 | 64.4 | 4.2 |
| 6 | | | | | |

Example 10

A mixture of 86.0% F33E and 14.0% ethanol by weight is prepared and placed into a 5-plate distillation apparatus, with a 10:1 reflux ratio. The temperature at the distillation head is recorded and several cuts of the distilled material are removed over time. Distilled material was analyzed by gas chromatography. Data is shown in table 15 below. Composition and temperature remained stable throughout the experiment, indicating azeotropic behavior of this mixture.

TABLE 15

| Distillation cut | Head temp (C.) | Wt % distilled | % F33E | % EtOH |
|---|---|---|---|---|
| 1 | 67.4 | 10 | 81.4 | 18.6 |
| 2 | 67.5 | 18 | 81.4 | 18.6 |
| 3 | 67.7 | 26 | 81.6 | 18.4 |
| 4 | 67.8 | 32 | 81.5 | 18.5 |
| 5 | 67.9 | 40 | 81.7 | 18.3 |
| 6 | | | | |

Example 11

A mixture of 84.0% F33E and 16.0% methanol by weight is prepared and placed into a 5-plate distillation apparatus, with a 10:1 reflux ratio. The temperature at the distillation head is recorded and several cuts of the distilled material are removed over time. Distilled material was analyzed by gas chromatography. Data is shown in table 16 below. Composition and temperature remained stable throughout the experiment, indicating azeotropic behavior of this mixture.

TABLE 16

| Distillation cut | Head temp (C.) | Wt % distilled | % F33E | % MeOH |
|---|---|---|---|---|
| 1 | 58.1 | 7 | 79.1 | 20.9 |
| 2 | 58.3 | 15 | 79.2 | 20.8 |
| 3 | 58.5 | 22 | 79.4 | 20.6 |
| 4 | 58.4 | 29 | 79.3 | 20.7 |
| 5 | 58.5 | 36 | 79.4 | 20.6 |
| 6 | | | | |

What is claimed is:

1. An azeotropic or azeotrope-like composition wherein the composition consists essentially of an azeotropic or azeotrope-like composition of:

about 64 to about 94 weight percent F33E and about 6 to about 36 weight percent ethanol.

2. An azeotropic or azeotrope-like composition as in claim 1, wherein the composition further consists essentially of an azeotropic or azeotrope-like composition selected from the group consisting of:

81.5 weight percent F33E and 18.5 weight percent ethanol having a vapor pressure of about 14.7 psia (101 kPa) at a temperature of about 67.6° C.

3. A process for cleaning, comprising:

a. contacting a surface comprising a residue with the composition of claim 1 and b. recovering the surface from the composition.

4. The composition of claim 1 further consisting essentially of an aerosol propellant.

5. The composition of claim 4 wherein the aerosol propellant is selected from the group consisting of air, nitrogen, carbon dioxide, difluoromethane, trifluoromethane, difluoroethane, trifluoroethane, tetrafluoroethane, pentafluoroethane, hexafluoropropane, heptafluoropropane, pentafluoropropene, n-butane, iso-butane and propane.

6. The process of claim 3 wherein said residue comprises an oil.

7. The process of claim 3 wherein said residue comprises a rosin flux.

8. The process of claim 3 wherein said surface is an integrated circuit device.

* * * * *